United States Patent [19]
Kritzler

[11] 3,997,294
[45] Dec. 14, 1976

[54] DEVICE FOR TREATING GASES

[75] Inventor: Gerhard Kritzler, Freudenberg, Germany

[73] Assignee: Apparatebau Rothemuhle Brandt & Kritzler, Rothemuhle, Germany

[22] Filed: Nov. 11, 1974

[21] Appl. No.: 522,696

[30] Foreign Application Priority Data
Nov. 24, 1973 Germany .......... 2358678

[52] U.S. Cl. .......... 23/277 C; 55/220; 55/222; 55/233; 55/411; 165/7
[51] Int. Cl.² .......... F23G 7/06
[58] Field of Search .......... 23/277 C; 110/8 A; 165/4, 6, 7; 55/233, 222, 220, 411, 267

[56] References Cited
UNITED STATES PATENTS

| | | | |
|---|---|---|---|
| 1,858,508 | 5/1932 | Kignell et al. | 165/4 |
| 3,183,961 | 5/1965 | Brandt | 165/7 X |
| 3,355,254 | 11/1967 | Hoskinson | 23/277 C |
| 3,404,965 | 10/1968 | Shiller | 23/277 C X |
| 3,530,806 | 9/1970 | Bowman | 55/220 X |
| 3,698,873 | 10/1972 | Kohayakawa et al. | 23/277 C |
| 3,796,550 | 3/1974 | Hall | 23/277 C |

FOREIGN PATENTS OR APPLICATIONS

| | | |
|---|---|---|
| 1,960,135 | 6/1971 | Germany |
| 1,244,326 | 7/1967 | Germany |
| 1,271,296 | 6/1968 | Germany |

*Primary Examiner*—Morris O. Wolk
*Assistant Examiner*—Arnold Turk
*Attorney, Agent, or Firm*—Elliot A. Lackenbach

[57] ABSTRACT

Gas treatment such as scrubbing or purificatory heating is carried out by treatment means in permanent gaseous communication with one end face of a rotary regenerative heat exchanger. At the other end face conventional inlet and outlet gas collecting arrangements are provided. A plenum chamber beyond or containing the treatment means allows for flow reversal of the gas treated, so that it may repass through the heat exchanger. Since collecting arrangements are provided at only one end face, the concomitant sealing arrangements need only be provided at that end face, and the rest of a support structure for the heat exchange mass (and which may also support at least some of the further treatment means) may be made of materials chosen solely with a view to resisting the physical and/or chemical conditions likely to be encountered.

12 Claims, 7 Drawing Figures

DEVICE FOR TREATING GASES

FIELD OF THE INVENTION

This invention relates to apparatus for treating gases and subjecting them to a regenerative heat exchange operation.

The treatment of the gases which may be performed in apparatus embodying the invention will usually be a purification, for example by scrubbing, by heating, by treatment with chemicals or by filtering.

BACKGROUND OF THE INVENTION

In past proposals for systems which carried out both these processes gases have passed completely through a regenerative preheater, either one with rotating regenerative mass and static delivery ducts (German Federal Pat. Nos. 1,244,326 and 1,271,296) or with a static mass and rotating delivery hoods, and gas treatments such as scrubbing etc. have been carried out in a separate part of the apparatus to which the regenerator was connected by ducts.

The sealing arrangements between ducts on the one hand, and the regenerative mass on the other hand of the regenerative preheater presents considerable difficulties and it has always been necessary to achieve this sealing at both of the end faces of the regenerative mass. Because of the necessity for accuracy and wear resistance at these sealing surfaces and because of the need for structural strength the support structure for the regenerative mass has always to have been made entirely of steel at these areas, and this is a material of limited resistance to corrosion and heat in the high temperature and/or corrosive conditions which are liable to be met in the working of the apparatus.

SUMMARY OF THE INVENTION

The present invention lessens the need for complex sealing arrangements of this type by arranging for sealing means, for communication between gas ducts and the regenerative mass, to be arranged at only one axial end face of a regenerative mass while beyond the other axial end face are arranged gas treatment means such as, for example, scrubbers, burners, chemical sprays, or filters. Then gas is passed from one gas duct through the regenerative mass, into the treatment volume which is at the other axial side of the mass, is there treated and is then returned through the mass to the other of the gas ducts. In this way heat changes induced in the gas as a result of the treatment may be used to preadjust the temperature of the incoming gas before treatment. That is to say, if the treatment of the gas in the treatment volume involves a loss of temperature in the gas, e.g., if scrubbing is carried out, then cooled gas returning through the regenerative mass takes heat from that mass which is thereby cooled and which then, when it comes into contact with the comparatively warm incoming gas before treatment, absorbs heat from that incoming gas thereby to reduce its temperature even before treatment has started. Conversely if the treatment involves imparting heat to the gas (e.g., if it involves burning or heating the gas) then the outgoing gas after such treatment gives up heat to the regenerative mass which is thereby heated and which when it comes into contact with incoming gas gives up some of its heat to that gas, thereby to preheat the gas before the treatment begins.

There may be a plurality of segmental chambers within the volume to direct flow of the gas through the regenerative mass and then to direct flow of the gas in the treatment volume; these chambers may be constituted by radially directed dividing walls of a rotatable support structure of the regenerative mass.

The treatment volume provided beyond one axial face of the regenerative mass will be dimensioned and arranged in accordance with the nature of the treatment so as to provide an adequate residence time for the gases in that volume.

It can be seen that not only has there been an elimination of one set of sealing surfaces but also the single set which remain constitute the only parts of the support structure of the regenerative mass which need necessarily be made of a material such as steel which enables the necessary accuracy and wear resistance to be obtained. The remainder of the support structure of the regenerative mass and of the walls of the regenerative chamber in which it is contained may consist of a material which is chosen solely from the view point of resistance to the chemical or physical influences to be expected during the working of the apparatus.

Particular embodiments of the invention will now be described with reference to the drawings in which:

FIG. 1 is a vertical sectional view of first embodiment of treatment apparatus according to the invention which cools purifies and then regeneratively reheats the gases, FIG. 2 is a view on the arrow A, FIG. 1 with an outer duct removed, FIG. 3 is a sectional elevation, on a larger scale, on the line B—B, FIG. 1, FIG. 4 is an elevational view partly in section through a second embodiment of the invention, FIG. 5 is a vertical sectional view of treatment apparatus which is a third embodiment of the invention FIGS. 6 and 7 are similar views of fourth and fifth embodiments respectively.

DESCRIPTION OF PREFERRED EMBODIMENTS

Figure 1:
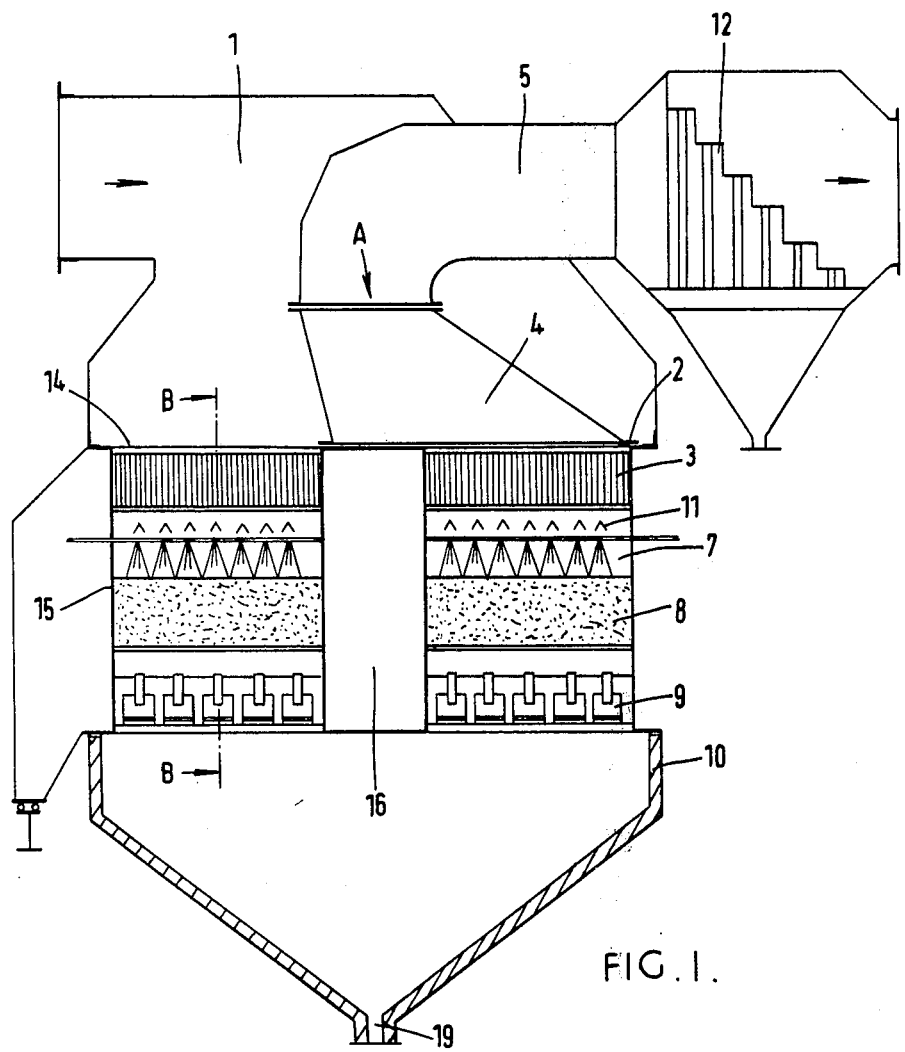

FIG. 1 shows a construction in which gases to be treated and subjected to a regenerative heat exchange operation are passed into the apparatus through an inlet duct 1. The duct encloses the whole of an upper axial end face 14 of a volume enclosed by a cylindrical wall 15 and by a conical wall 10. There is a central, vertically disposed cylinder 16, of a stationary support structure borne within the wall 15. At the uppermost portion of the support structure, there is supported a regenerative heat exchange mass 3. The support structure is divided by radially extending walls 17 (FIG. 3) into sixteen sectors 18 (FIG. 2) and the regenerative mass 3 is made up of a plurality of trapezoidal packs of heat exchange elements, metallic, ceramic or other, fitted into the sectoral chambers in manner known per se.

Travelling over the upper axial end face 14 of the support structure there is an outlet duct in the form of a rotatable hood 4 which in manner also known per se covers at any given time a segmental shaped sector of the upper surface 14. A sealing frame 2 at the edges of the hood forms a seal between it and the surface 14. The hood 4 is rotated by driving means, not shown, and is for receiving gas travelling in an upward direction from the regenerative mass. The hood 4 is sealed in gas-tight fashion through a swivel joint to an outlet duct 5 and this may lead to a conventional additional purification chamber schematically indicated at 12. However, according to the invention treatment means such as purification means are provided in the volume below the regenerative mass 3 and gas may reverse its direction of flow to repass through the regenerative mass after it has passed through the treatment apparatus.

Impure gas is incoming through the duct 1 and passes down through the segments of the regenerative mass 3 which are not sealed off at the time by the hood 4, down also through the sectors of the treatment apparatus which lie below those sectors of the regenerative mass, passes into the free volume below and then flows upwardly back through the sectors of the treatment apparatus which are at the time below the hood 4 and back through the sectors of regenerative mass 3 which are below the hood 4, through the hood 4 and duct 5. It can be seen that there is no necessity to provide any rotating hoods at the lower surface of the regenerative mass (or at the lower surface of the cylinder bounded by wall 15) since it is essentially the same medium which flows in both directions through the regenerative mass, it being different by virtue only of having been treated between the two passages through that mass. This means that sealing arrangements for preventing leakage at the edges of the hood, which are per se conventional, need only be provided at one axial end face of the mass and hence an accurately machined and wear resistant wear surface for the support structure need be provided only by a metal, preferably steel, edge seen in section at 3a FIG. 3 covering the uppermost edge of the support structure walls 17. The metal edge is, in this embodiment, provided by a frame of channel section steel sealed to the walls of the structure by cement or by expansion sleeves of plastics, asbestos or metal. The rest of the height of the radially extending walls of the structure, as well as at least the lining of the cylindrical outer wall 15 may be made of any material suitable to resist the physical and/or chemical conditions which are likely to be encountered in use, for example a refractory material, internally reinforced as necessary.

Any treatment of the gases may be carried out below the regenerative mass; in the first embodiment we show a scrubbing treatment.

The walls 17 support at their uppermost end the regenerative mass 3 which is supported between the walls by a grid 3b. Droplet catchers 11 and downwardly directed spray nozzles 7 are supported above a contact mass 8 of high surface area to provide for intimate mixing of the gases and the scrubbing liquids sprayed from the nozzles 7, the droplet catchers 11 being to catch any condensate dripping from the regenerative mass and stopping that condensate polluting the spray liquid. A further grid or grating 8a supports the contact mass 8, and below this grating come gas/liquid cyclones 9 of the centrifugal type. The gas then passes into a volume or plenum chamber defined by the conical wall 10 which may be made up of or lined by any material suitable to resist the physical conditions likely to be encountered and which may have a drain outlet 19 for release of liquid from the spray nozzle 7 which collects in that volume. Then the gas reverses its direction of flow and passes up again through the various treatment stages 9, 8, 7 and through that portion of the regenerative mass 3 which at that time is below the hood 4. Catchers 11 now prevent the clean gas carrying liquid droplets upwards onto the regenerative mass.

As the gas passes downward through the regenerative mass for the first time it is cooled by contact with that mass and, by appropriate control of flow rates, etc., can be controlledly cooled to a temperature at which the purification treatments will be most effective. As it goes through a purification treatment such as scrubbing it will lose heat so that when it returns through the regenerative mass it will pick up heat from that mass and be warmed ready for further treatment or discharge into the atmosphere. If it is to be passed into the atmosphere the increased temperature increases its buoyancy in relation to the ambient air so that any remaining impurities will be further dispersed.

Conventional cleaning devices, such as soot-blowers and washing installations may be present for cleaning the surfaces of the heat exchange elements in the regenerative mass, and may either be stationary or rotatably mounted above it.

Figure 2:
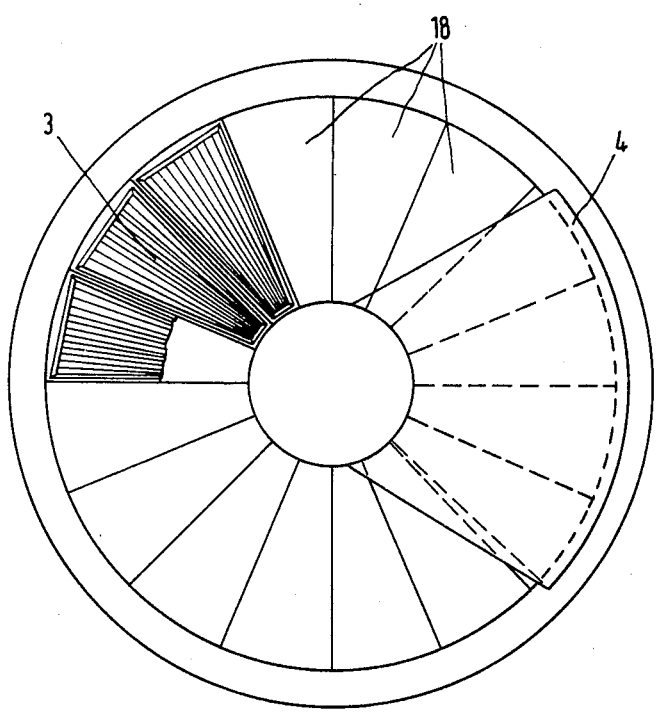
Figure 3:
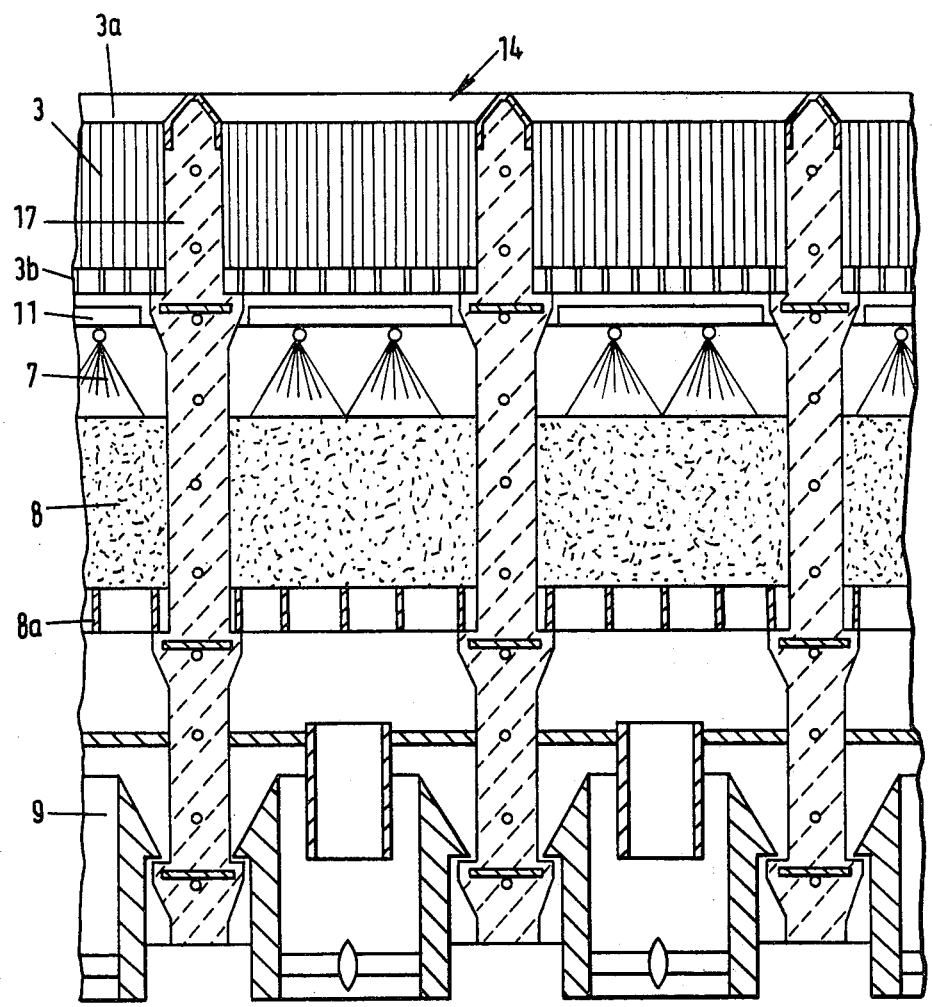
Figure 4:
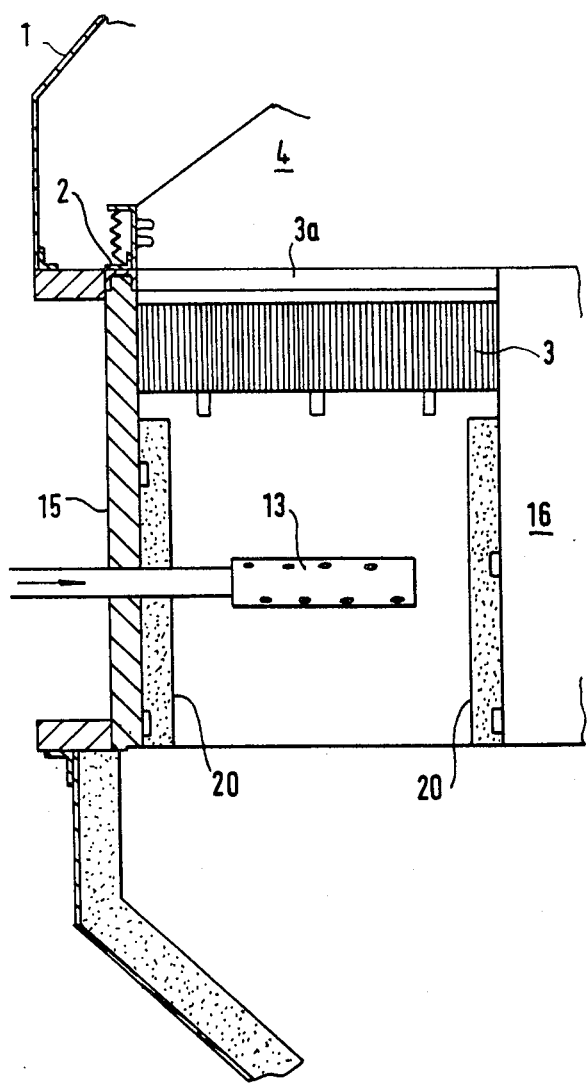

FIG. 4 shows a second embodiment wherein, in place of the scrubbing purification treatment means shown in the first embodiment, gases are going to be purified by a combustion process. Gases bearing toxic or malodorous substances, for example, are fed to the apparatus as before and are passed through the regenerative heating mass 3. They then come to where at least one burner 13 is provided in each sector. The burner is oil or gas fired. To support combustion the gas to be purified may be used if its oxygen content is sufficient; otherwise air is supplied additionally. By means of this burner 13 the gas to be purified is brought to a high temperature at which the harmful substances break down or are oxydized and thereafter the purified gas passes back upwardly through that portion of the regenerative mass which is at that time below the hood 4. In this case the temperature of the gas is raised by the treatment performed on it and so it gives up heat to the regenerative mass and passes back through it; then incoming impure gas passing the heated regenerative mass takes up heat from that mass and is preheated in preparation for its combustion treatment. It has been found that a suitable temperature to which the gas is brought by means of the burner 13 will be about 800° C, and the wall 15 and central column 16 may be lined by a refractory liner 20. The temperature of the gas after repassage through the mass 3 may be of the order of 300° C. At such temperatures it may then be treated in, e.g., a dust extractor. It can be seen that the absence of the need for sealing at the lower axial end face of the regenerative mass or at the lower axial end face of the volume enclosed by the wall 15 means that there is design freedom to bring for example refractory material to the extreme end face in question. In the embodiment of FIGS. 1 to 3 the whole of the exposed faces of the radially extending walls 17 (below the edge 3a) and of the gratings 3b, are of material which is for example acid resistant so as to avoid corrosion problems which will arise because, at and below the lower end of the regenerative mass, the gases will normally be below their dew point (i.e., they are at temperature and pressure conditions at which they will tend to deposit liquid droplets from vapor entrained in them). This problem of corrosion is particularly serious at the cold end of regenerators, i.e., that axial end face of the regenerative mass which in normal working of the regenerator is at a lower temperature than the other end face. In the embodiment of FIGS. 1 to 3 the cold end is the lower end face and corrosion resistant materials may be used there without consideration of that accuracy and wear resistance which is essential at the upper end face where there will be contact with the sealing frame 2 of the end hood.

In these embodiments radially extending dividing walls 17 have been substantially parallel to each other at all points as seen in sections such as FIG. 3. However it is possible to design these walls in such a way that they give advantageous flow patterns for particular treatments, e.g., they may be not substantially parallel at all points but form constrictions between them in the manner of a venturi nozzle which in a scrubbing process will improve the efficiency of the mixing and cleaning effect conferred by the water sprayed into the gas.

Figure 5:
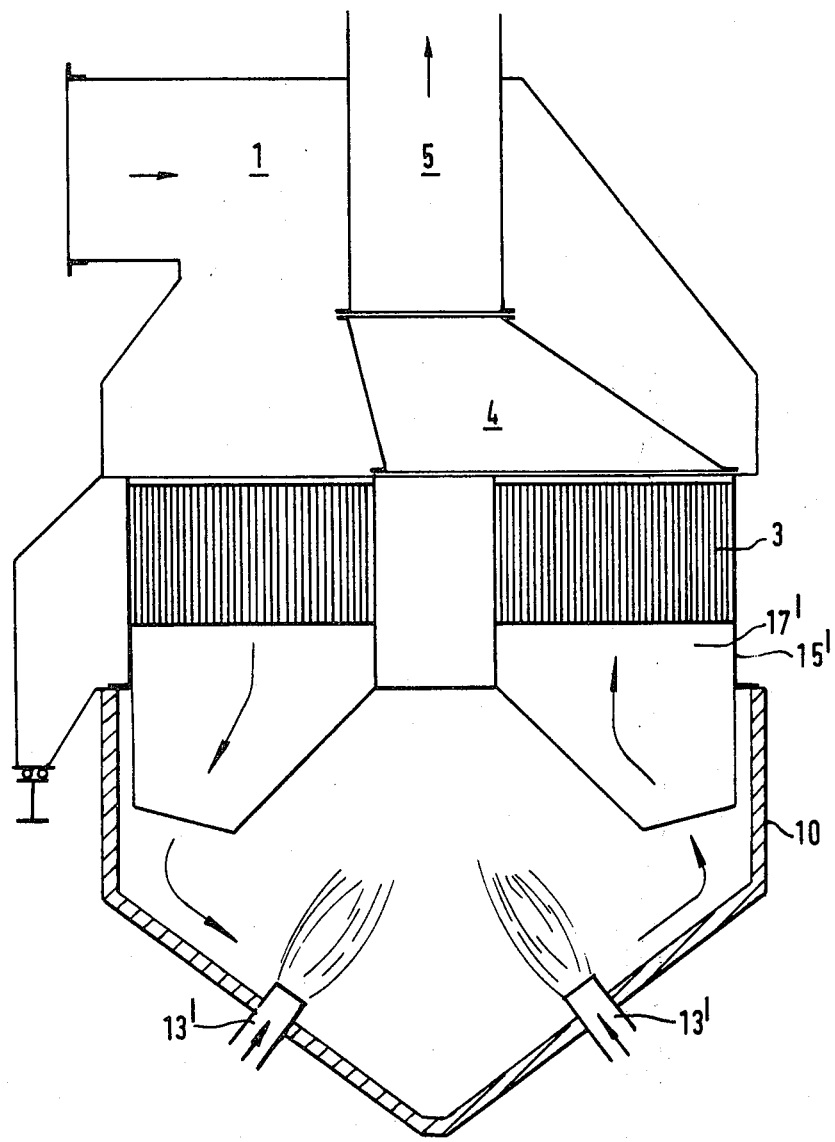

In the embodiment shown in FIG. 5, the construction at the upper axial end face of the regenerative mass of the treatement apparatus is as in previous embodiments but here the cylindrical chamber wall 15' within which the regenerative mass 3 is supported does not itself contain further treatment apparatus. Radial partition walls 17' which define the sectors and which at their uppermost end portions divide between the trapezoidal packs of heat exchange elements are extended downwardly into the plenum chamber defined by the wall 10 to form radially extending, planar, guide walls or vanes which direct the flow of gas in that plenum chamber. Within this chamber are provided the treatment means, in this case burners 13'. The heat exchange characteristics of this apparatus are similar to those described with reference to FIG. 4 but there is the added advantage that formation of the radial extending walls 17' as shown with their extension into the plenum chamber enclosed by the wall 10 ensure predetermined flow characteristics within that chamber and a predetermined residence time, leading to efficient and economical treatment of the gases. It is also therefore possible not to supply one burner 13 for each sector, as necessary in FIG. 4 but merely one, two or more burners within the plenum chamber.

Figure 6:
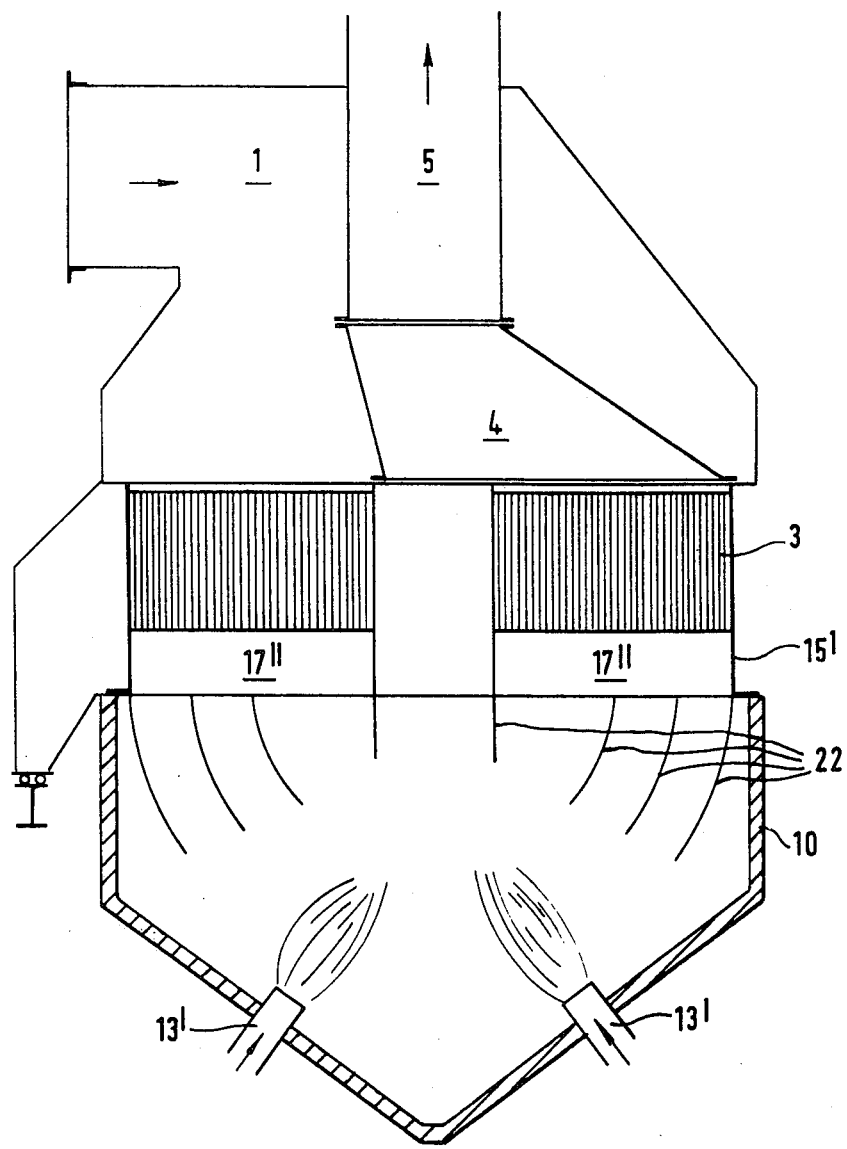

The embodiment shown in FIG. 6 is one in which below the axial end face of the volume defined by walls 15' and below the end of radially extending walls 17'' there are provided annular guide vanes 22 to direct flow of gas appropriately within the plenum chamber enclosed by the conical wall 10.

The same or similar means may be employed to control the behaviour of gases subjected to scrubbing purification, and to ensure, for example, that the gases are whirled around in the treatment volume. Treatment means other than burners 13' may be provided in the plenum chambers.

Figure 7:
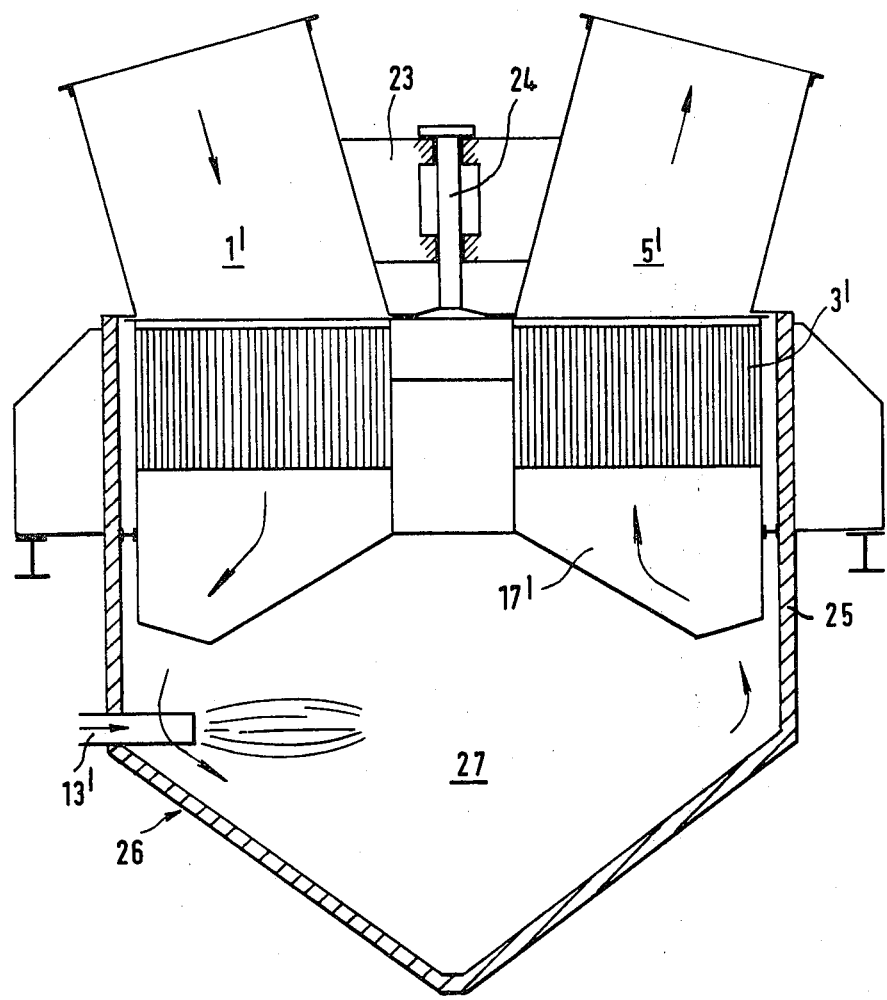

FIG. 7 shows how within the invention both input and output ducts may be provided over the one axial end face of a rotatable support structure of the regenerative mass 3'. Here, an input duct 1' and an output duct 5' are provided with arms 23 bearing a vertical central axis 24. The regenerative mass 3' rotates about that axis, being supported by it. Alternatively the rotating mass may be supported at its outer periphery on a ring of balls or rollers on the cylindrical wall portion 25 of a housing 26 enclosing the regenerative mass 3' and a treatment plenum chamber 27. Suitable support arrangements and seals for such arrangements are known per se, see, e.g., German Pat. No. 1,244,326. Radially extending walls 17' of a support structure for the mass guide gases into the treatment chamber enclosed in the housing 26 below the regenerative mass, wherein gases are heated or burned by one or more burners 13' before returning upwardly through the mass 3' to the stationary outlet duct 5'. This arrangement has the advantage of lessened head height above the mass since the duct 1' and 5' do not have to be brought to a central, axially disposed, position; also sealing at a swivel joint of a rotating hood (compare FIGS. 1, 5 and 6) is avoided.

I claim:
1. Gas treatment apparatus comprising an inlet duct leading to one axial end face of a stationary regenerative heat-exchange mass of a rotary regenerative preheater wherein said mass comprises a first gas treatment means, an outlet duct for receiving gas from said one axial end face of the heat-exchange mass of the rotary regenerative preheater, and means for causing rotation of at least one of the inlet and outlet ducts about the axis of the heat-exchange mass; further gas treatment means provided beyond the other axial end face of the heat-exchange mass, the regenerative mass being divided into a plurality of sectors by dividing walls; and a sealing surface between the regenerative structure and the at least one rotatable duct provided by a metal element at the said one axial end face and borne by a support structure, the support structure supporting the regenerative heat-exchange mass and including the said dividing walls and being stationary; wherein at least the exposed surface of the remainder of the height of the dividing walls is provided by a material selected for resistance to the conditions to be encountered; and wherein there is further provided a plenum chamber into which all the said sectors open in common so that gas may pass from the inlet duct through the heat-exchange mass into the plenum chamber and return through the mass to the outlet duct and a further treatment may be performed by said further gas treatment means on the gas between its passes through the heat-exchange mass.

2. Apparatus according to claim 1 wherein the gas outlet duct communicates with an aftercleaning chamber.

3. Apparatus according to claim 1 wherein the dividing walls have at their ends adjacent said other axial end face guide means adapted to affect flow of gas in the plenum chamber.

4. Apparatus according to claim 1 wherein the further treatment means comprises burners.

5. Apparatus according to claim 1 wherein the metal element is in the form of a grid at the ends of the dividing walls of the support structure nearer the one axial end face, and connection means connect the grid to said dividing walls in a gas tight manner.

6. Apparatus according to claim 5 wherein said connection means comprises expansion sleeves.

7. Apparatus according to claim 1 wherein at least one of the further treatment means is in the plenum chamber.

8. Apparatus according to claim 7 wherein the further treatment means comprises at least one burner in the plenum chamber.

9. Apparatus according to claim 1 wherein the support structure of the preheater is subdivided in the form of sectors extending also beyond the said other axial end face in such a manner that they form a plurality of parallel flow ducts in each of which the said further treatment means is arranged beyond the said other axial end face, said further treatment means comprising in succession from the said other axial end face, respective drop intercepting devices, a respective chamber with nozzles for the injection of liquid scrubbing agents, and respective separating devices comprising centrifugal separators, and all of said plurality of parallel flow ducts opening out into the common plenum chamber.

10. Apparatus according to claim 9 wherein said support structure serves to additionally receive the weight of the further gas treatment means.

11. Apparatus according to claim 9 wherein the plenum chamber acts as a collecting bunker for liquid substances separated out by the separating devices and also as a guide device for the containment of the gases, which then flow in reverse sequence through the further treatment devices and through the regenerative heat-exchange mass.

12. Apparatus according to claim 11 wherein the gas outlet duct communicates with an aftercleaning chamber.

* * * * *

UNITED STATES PATENT AND TRADEMARK OFFICE
CERTIFICATE OF CORRECTION

PATENT NO. : 3,997,294
DATED : Dec. 14, 1976
INVENTOR(S) : Gerhard Kritzler

It is certified that error appears in the above-identified patent and that said Letters Patent are hereby corrected as shown below:

Beneath the heading: "[30] Foreign Application Priority Data" add the additional citation:

Sept. 23, 1974  Germany  2445378

Signed and Sealed this

Third Day of May 1977

[SEAL]

Attest:

RUTH C. MASON
*Attesting Officer*

C. MARSHALL DANN
*Commissioner of Patents and Trademarks*